United States Patent Office 3,234,263
Patented Feb. 8, 1966

3,234,263
PROCESS FOR PREPARING DIARYL
CARBONATES
Raymond P. Kurkjy, Geneva, Switzerland, and Markus Matzner, Edison Township, Middlesex County, and Robert J. Cotter, New Brunswick, N.J., assignors to Union Carbide Corporation, a corporation of New York
No Drawing. Filed July 3, 1962, Ser. No. 208,676
12 Claims. (Cl. 260—463)

The present invention relates in general to the preparation of diaryl carbonates, and more particularly it relates to a novel anhydrous process for reacting aryl monochloroformates inter se to form diaryl carbonates.

Diaryl carbonates, typified by diphenyl carbonate, are well known compounds which heretofore have been prepared by a variety of chemical reactions. For example it has been proposed to react phenols with phosgene in the presence of equimolar quantities of organic tertiary bases to bind the hydrogen chloride produced as a by-product. Aqueous sodium hydroxide has also been employed to neutralize the hydrogen chloride in such reactions.

It has further been proposed to obtain diaryl carbonates by reacting an appropriate aryl chloroformate with pyridine and water. Insofar as is known however, no operable anhydrous reaction system has been heretofore proposed in which the inter se condensation of aryl chloroformates to form diaryl carbonates is accomplished.

It is therefore the general object of the present invention to provide a novel non-aqueous process for preparing diaryl carbonates in which the necessity for removal of large amounts of contaminating catalyst residues and reaction by-products is avoided or at least greatly reduced.

This general object as well as other and more particular objects which will be obvious from the specification are accomplished in accordance with the process of this invention which comprises heating at elevated temperatures an anhydrous reaction system comprising an aryl monochloroformate and a sulfite, carbonate, bicarbonate, or bisulfite of a metal of Groups I–A, II–A, and II–B of the Deming Periodic System of Elements.

The aryl chloroformates suitably employed in the present process have the general formula

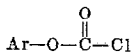

wherein Ar represents a monovalent aromatic radical free of substituent groups reactive in the reaction system employed. Thus Ar can be an unsubstituted phenyl, α-naphthyl, β-naphthyl, anthryl, or phenanthryl radical, or any of these radicals which contain one or more inert ring substituents free of acetylenic unsaturation as for example alkyl such as methyl, ethyl, propyl, butyl, isopropyl, amyl, octyl; alkenyl such as ethenyl, propenyl; aryl such as phenyl, methylphenyl, naphthyl, chlorophenyl, ethylchlorophenyl; halogen such as chlorine, bromine, fluorine, nitro; oxyalkyl such as oxymethyl, oxyhexyl; cycloalkyl such as cyclobutyl, cyclopentyl, cyclohexyl, and the like.

Preferably the aryl chloroformates conform to the general formula (I)

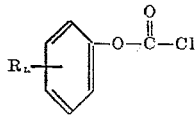

wherein R is a monovalent hydrocarbon radical free of aliphatic unsaturation and containing from 1 to 10 carbon atoms and $n$ has a value of from 0 to 4 inclusive. Most particularly preferred are those species conforming to structural Formula I above wherein R is an alkyl group containing from 1 to 3 carbon atoms and $n$ has a value of from 0 to 1.

The metal salts which are reacted with the aryl chloroformates described above in accordance with the present process are those in which the cation is a metal ion in its highest valence state selected from Groups I–A, II–A, and II–B of the Deming Periodic System of Elements [Handbook of Chemistry and Physics, page 312, 30th Ed. (1947), Chemical Rubber Publishing Company, Cleveland, Ohio] and the anion is a member selected from the group consisting of $CO_3^{--}$, $HCO_3^-$, $SO_3^{--}$, and $HSO_3^-$.

The metals of these groups, in the form of the carbonate, bicarbonate (acid carbonate) sulfite, or bisulfite which are of the greatest practical interest because of their ready availability and relatively low cost are lithium, sodium, potassium, rubidium, cesium, beryllium, magnesium, calcium, strontium, barium, zinc, cadmium and mercury. Preferred compounds are the alkali and alkaline earth metal carbonates and the alkali metal bicarbonates, sulfites, and bisulfites. The alkali metals are those of Group I–A of the Deming Periodic Table, and the alkaline earth metals are classified as Group II–A elements. Especially preferred species are magnesium carbonate, sodium carbonate, and sodium bicarbonate, sodium sulfite, and sodium bisulfite.

Specifically illustrative of the metal salts suitably employed as reagents in the present process are lithium bicarbonate, sodium carbonate, sodium sulfite, potassium carbonate, rubidium bicarbonate, cesium sulfite, magnesium carbonate, magnesium cadmium carbonate, and mercury carbonate.

The proportion of metal salt relative to the aryl chloroformate in the reaction mixture is not a narrowly critical factor. Although we do not wish to be bound by any particular theory or reaction mechanism, it is believed that for a theoretically complete reaction the stoichiometric quantity of metal carbonate is one mole for each mole aryl dichloroformate present. The same stoichiometry is applicable in the case of Groups I–A, II–A, and II–B metal carbonates and sulfites, and Group II–A and II–B bicarbonates and bisulfites. For Group I–A bicarbonate and bisulfites, however, two moles of metal salt are necessary for complete reaction with one mole of aryl dichloroformate. It will be obvious to those skilled in the art, however, that even large excesses of either the metal salt of aryl dichloroformate present in the reaction mixture will not destroy the fundamental process reaction.

Although the reaction between the metal salt and the aryl chloroformate proceeds without benefit of a catalyst, substantially greater yields of the desired diaryl carbonate are in general obtained by adding to the reaction system a tertiary amine base which serves as catalyst for the reaction. It has been found that even trace amounts of conventional organic tertiary nitrogen bases as pyridine; 2-methyl pyridine; 2,6-dimethyl pyridine; quinoline; isoquinoline; 4 - methylquinaldine; tetracholine; 2 - phenylquinoline; 7-nitroquinoline; benzyldimethylamine; tributylamine; tripentylamine; N,N'-dipropylpiperazine; N,N'-dimethylhomopiperazine; N-phenylpiperidine; N-methylpiperidine; triphenylamine; and 2,6-dichloropyridine are quite effective catalysts. Pyridine is preferred. By trace amount is meant a quantity of organic tertiary base of as little as 0.0001 mole per mole of chloroformate present. Far greater amounts of as much as 0.10 mole per mole of chloroformate can be employed, but no significant increase in catalytic effect is achieved.

The present process can be carried out in bulk, preferably with the aryl chloroformate in the molten state, or in an inert solvent medium. Suitable solvents serving as the reaction medium are advantageously the higher boiling (i.e. >about 50° C.) halogenated hydrocarbons such as chlorobenzene, dichlorobenzene, sym. tetrachloroethane, carbon tetrachloride, and chloroform; but other conventional solvents such as benzene, toluene, xylenes, and the like can also be used.

Reaction temperatures are not critical, but optimum values vary depending primarily upon the particular aryl chloroformate employed. In bulk reaction systems, temperatures within the range of from about 80° C. to about 150° C. have been found to be entirely suitable. In reactions carried out in an inert solvent medium at reflux, the boiling point temperature of the solvent is determinative of the reaction temperature at atmospheric pressure.

By employing mixtures of aryl chloroformates the present process is readily employed to prepare mixed diaryl carbonates.

The present invention is more fully illustrated by the following examples. It is to be understood that these examples are in no way intended to be limitative of the proper scope of the invention which is defined in the appended claims.

EXAMPLE 1

In a glass reactor equipped with a stirrer and thermometer and heated by means of an external oil bath, a mixture of 5 grams (0.032 mole) phenyl chloroformate, one drop of pyridine (dry) and 1.35 grams (0.016 mole) magnesium carbonate was heated at 180° C. for about twenty hours. Throughout the heating period carbon dioxide was evolved. When evolution of carbon dioxide has substantially ceased, the reaction mass was cooled to room temperature yielding a solidified mass. The solid was extracted with hot heptane and the resulting solution filtered. The filtrate was concentrated by evaporation and cooled to produce crystalline diphenyl carbonate in 98 percent yield. M.P.=74 to 78° C.

EXAMPLE 2

Using substantially the same apparatus and procedure as described in Example 1, a mixture of 5 grams (0.032 mole) phenyl chloroformate, 2 grams (0.016 mole) anhydrous sodium sulfite and one drop of pyridine was heated at 180° C. for about twenty hours. During the heating period a mixture of carbon dioxide and sulfur dioxide was evolved. After cooling, extracting, and crystallizing the product as in Example 1, a 70 percent yield of white diphenyl carbonate was obtained having a melting point range of 76 to 78° C.

EXAMPLE 3

To a glass reactor equipped with a thermometer, stirring means, and a reflux condenser are charged equimolar quantities (0.32 mole) of o-cresylchloroformate and zinc bicarbonate, 25 ml. o-dichlorobenzene and one drop of benzyldimethylamine. The mixture thus formed is heated gently to about 80° C. at which time $CO_2$ evolution is observed. Heating is stopped for about one hour and thereafter the mixture is again heated up to the reflux temperature of the o-dichlorobenzene and held at this temperature for about twenty hours. After cooling, the mixture is filtered and the filtrate evaporated under vacuum. The di-o-cresyl carbonate residue after recrystallization from heptane is produced in a yield of about 97 percent.

EXAMPLES 4 TO 10

Using the bulk reaction apparatus of Example 1 and the solvent medium apparatus of Example 3 where appropriate a variety of diaryl carbonates are produced using a variety of metal salts in accordance with the present invention. The reaction formulations and resulting diaryl carbonates are set forth in Table I below:

*Table I*

| Ex. No. | Chloroformate Reagent | Metal Salt | Molar Ratio, $Ar\text{-}O\text{-}\overset{O}{\underset{\|}{C}}Cl$/Metal salt | Reaction Temperature, °C. | Reaction Period, hrs. | Reaction Product |
|---|---|---|---|---|---|---|
| 4 | β-Naphthyl chloroformate | $BeCO_3$ | 2:1 | 130 | 22.5 | Di-β-naphthyl carbonate. |
| 5 | m-Vinylphenyl chloroformate | $HgSO_3$ | 2:1 | 145 | 18 | Di-m-vinylphenyl carbonate. |
| 6 | p-Chlorophenyl chloroformate | $Ca(HCO_3)_2$ | 2:1 | 180 | 10 | Di-p-chlorophenyl carbonate. |
| 7 | o-Cyclohexylphenyl chloroformate | $KHSO_3$ | 1:1 | 180 | 6 | Di-o-cyclohexylphenyl carbonate. |
| 8 | m-Methoxyphenyl chloroformate | $SrCO_3$ | 2:1 | 130 | 15 | Di-m-methoxyphenyl carbonate. |
| 9 | p-Octylphenyl chloroformate | $Na_2CO_3$ | 1:1 | 110 | 20 | Di-p-octylphenyl carbonate. |
| 10 | Phenylchloroformate | $NaHCO_3$ | 1:1 | 180 | 8 | Diphenyl carbonate. |

The diaryl carbonates prepared in accordance with the present process find extensive use as carbonate precursors in the preparation of polycarbonate resins by the method well known as ester-interchange. They are also precursors for polyurethanes and polyureas. They can be used to form monomeric ureas and urethanes and are thus valuable synthetic intermediates.

What is claimed is:

1. Process for preparing a diaryl carbonate which comprises heating at a temperature sufficient to cause the evolution of carbon dioxide a reaction mixture comprising an aryl monochloroformate having the general formula $$Ar-O-\overset{O}{\underset{\|}{C}}-Cl$$

wherein Ar is selected from the group consisting of aryl and aryl substituted by a member selected from the group consisting of alkyl, alkenyl, aryl, halogen, nitro, oxyalkyl and cycloalkyl and a metal salt in which the cation is a metal ion in its highest valence state selected from the class consisting of Groups I–A, II–A, and II–B of the Deming Periodic System of Elements and the anion is a member selected from the group consisting of $CO_3^{--}$, $HCO_3^-$, $SO_3^{--}$, and $HSO_3^-$.

2. Process according to claim 1 in which the aryl monochloroformate and metal salt are heated in contact with each other in an inert organic solvent medium.

3. Process according to claim 2 wherein the reaction system includes a catalytic amount of tertiary amine bases.

4. The process according to claim 1 wherein the aryl monochloroformate has the general formula

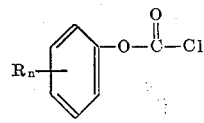

wherein R is a monovalent hydrocarbon radical free of acetylenic unsaturation and containing from 1 to 10 carbon atoms and $n$ has a value of from zero to 5.

5. The process according to claim 4 wherein R is an alkyl group and $n$ has a value of 1.

6. The process according to claim 4 wherein $n$ has a value of zero.

7. Process according to claim 4 wherein the metal salt is of a metal of group I–A of the Deming periodic system of elements.

8. Process according to claim 4 wherein the metal salt is of a metal of group II–A of the Deming periodic system of elements.

9. Process according to claim 4 wherein the metal salt is sodium carbonate.

10. Process according to claim 4 wherein the metal salt is sodium bicarbonate.

11. Process according to claim 4 wherein the metal salt is sodium sulfite.

12. Process according to claim 4 wherein the metal salt is sodium bisulfite.

References Cited by the Examiner
UNITED STATES PATENTS

| | | | |
|---|---|---|---|
| 2,370,571 | 2/1945 | Muskat et al. | 260—463 |
| 2,837,555 | 6/1958 | Lee | 260—463 |

CHARLES B. PARKER, *Primary Examiner.*